United States Patent [19]

Chiao

[11] 4,312,974

[45] Jan. 26, 1982

[54] CURING AGENTS FOR EPOXY RESINS

[75] Inventor: Wen B. Chiao, Piscataway, N.J.

[73] Assignee: National Starch and Chemical Corporation, Bridgewater, N.J.

[21] Appl. No.: 141,718

[22] Filed: Apr. 18, 1980

[51] Int. Cl.$^3$ .......................................... C08G 59/58
[52] U.S. Cl. .................. 528/114; 525/507; 528/94; 528/98; 528/99; 528/102; 528/341
[58] Field of Search ............... 528/94, 114, 341, 97, 528/98, 99, 102; 525/507

[56] References Cited

U.S. PATENT DOCUMENTS

| | | | |
|---|---|---|---|
| 2,717,885 | 9/1955 | Greenlee | 260/47 |
| 2,970,972 | 2/1961 | Wear et al. | 260/18 |
| 3,277,052 | 10/1966 | Thompson et al. | 260/47 |
| 3,301,795 | 1/1967 | Wooster | 260/2 |
| 3,329,652 | 7/1967 | Christie | 260/47 |
| 3,356,645 | 12/1967 | Warren | 260/47 |
| 3,519,576 | 7/1970 | Johnson | 260/2 |
| 3,562,213 | 2/1971 | Collis | 260/47 |
| 3,746,686 | 7/1973 | Marshall et al. | 260/47 EN |

OTHER PUBLICATIONS

Fukuda et al., "Hardening of Epoxy Resin Adhesives", Chemical Abstracts 65, 13896g (1966).
Air Products & Chemicals, Inc., "Heat Sensitive Catalysts", Chemical Abstracts 84, 106634j (1976).

*Primary Examiner*—Earl A. Nielsen
*Attorney, Agent, or Firm*—Edwin M. Szala; Margaret B. Kelley

[57] ABSTRACT

Novel unitary, storable, heat-curable epoxy resin systems are prepared which contain a polyepoxide and a curing amount of a salt of piperazine and a $C_3$–$C_{21}$ polycarboxylic acid. In a preferred aspect the salt is present in a stoichiometric amount. The resin system is cured into an insoluble, infusible resin product by heating thereof at a temperature greater than 50° C., preferably 50°–250° C., for a time sufficient to complete the cure.

11 Claims, No Drawings

CURING AGENTS FOR EPOXY RESINS

BACKGROUND OF THE INVENTION

This invention relates to novel unitary, storable, heat-curable epoxy resin systems and the semi-latent curing agents incorporated therein. It also relates to the process for heat-curing epoxy resin systems containing these curing agents to produce insoluble, infusible cured resin products. It further relates to the process for preparing these curing agents by reacting piperazine with polycarboxylic acids to form amine salts.

The curing agents employed in the formulation of epoxy resins have a significant influence on the physical and chemical properties of the cured resins and the shelf or pot life of the compositions. They may be classified as non-latent, semi-latent, or latent curing agents or co-curing agents (i.e. accelerators).

As used herein, the term "shelf life" or "pot life" refers to the resin system's storage stability and working life, i.e. the time that it remains uncured and, in the case of liquid resins, free-flowing.

As used herein, the term "semi-latent" curing agents refers to agents which will be essentially unreactive with the epoxy resins for several months at room temperature and which will serve to cure (harden) the resins rapidly at moderately elevated temperatures. In contrast, "non-latent" curing agents cure epoxy resins rapidly at room temperature, whereas "latent" curing agents are essentially unreactive for an indefinite period at room temperature and cure the resins only at elevated temperatures and then not always rapidly.

Unitary systems (one package) are desirable because they eliminate the additional mixing step before using, avoid the possibility that the consumer may use the incorrect amount of curing agent, and further avoid the need for complex packaging. Previous attempts to provide unitary systems have involved the use of aromatic amines as latent curing agents; they have an excellent shelf life but require high curing temperatures and long cure times. Dicyandiamide (often called Dicy) and dihydrazides have also been used as latent curing agents; unfortunately these curing agents also suffer from a slow cure at elevated temperatures. Dicy, the most desirable because it gives the best strength properties, has a shelf life of over 1 year, but it requires 1 hour to cure at 170° C. and does not cure at all at 120° C.

Various amine salts have been suggested for use in epoxy resin systems; they have functioned as non-latent curing agents and co-curing agents, as well as latent or semi-latent curing agents. Those useful as semi-latent or latent curing agents include amine-boron trifluoride complexes (U.S. Pat. No. 2,717,885), nylon salts (Japan. Pat. No. 66/7458), imidazole salts of monocarboxylic acid (U.S. Pat. No. 3,356,645), and imidazole salts of polycarboxylic acids or anhydrides (U.S. Pat. No. 3,746,686).

Amine-boron trifluoride complexes, e.g. ethylamine-boron trifluoride, are well known. They have an excellent shelf life but, like Dicy and the dihydrazides, they are slow to cure epoxy resin systems even at elevated temperatures, and the salts themselves are hygroscopic and hydrolyze in moist air. Epoxy systems containing nylon salts are stable for several months; however, a system containing the nylon salts of diethylenetriamine and adipic acid required 4–5 hours to cure at 130° C. and the adhesive strength of the resulting bond was only 250 kg/cm². Epoxy systems containing the imidazole salts of monocarboxylic acids, e.g. 2-ethyl-4-methylimidazole acetate, benzimidazole acetate, or imidazole lactate, have a relatively long shelf life; however most are hygroscopic. Imidazole salts of polycarboxylic acids or anhydrides, e.g. imidazole phthalate monohydrate and monoimidazole adipate, are somewhat less hygroscopic than the salts of the monocarboxylic acid; however, epoxy systems containing them were stable for only about 7 days at room temperature and then only when low levels of the salts were used.

It is an object of this invention to provide novel unitary, storable, heat-curable epoxy resin systems containing semi-latent curing agents (hereafter simply referred to as curing agents) and process for curing these systems at moderately elevated temperatures to give high performance products.

SUMMARY OF THE INVENTION

The above object is achieved by the preparation of epoxy resin systems containing polyepoxides and, as curing agents, amine salts prepared from piperazine and polycarboxylic acids. The quantity in which the polyepoxide and curing agent are combined is calculated so as to provide an equivalent amount of amine salt, which will depend on the epoxide equivalent weight and the number of carboxyl groups in the polycarboxylic acid used to prepare the salt. The resin systems are cured by heating at 50° to 250° C., preferably at 100° to 180° C., for a time varying from 2 hours to 1 minute depending on the temperature.

DESCRIPTION OF PREFERRED EMBODIMENTS

Preparation of Curing Agents

In preparing the curing agents used herein, piperazine and a polycarboxylic acid are combined in a ratio sufficient to provide at least one carboxyl group for each secondary amino group. Preferably the ratio of carboxyl to amino groups is about 1:1.

Generally an alcoholic solution of piperazine is slowly added with stirring to a heated alcoholic solution of the polycarboxylic acid; however, the order of addition is not important. The reaction is instantaneous and the salt precipitates. It may be possible to carry out the reaction at room temperature allowing additional time for complete precipitation of the salt. Typically lower alkyl alcohols such as ethyl and isopropyl alcohol are used; however, other organic solvents may be suitable, with the only requirement being that the starting materials be soluble therein and the piperazine salt be insoluble therein if it is desired to recover the salt by filtration.

Suitable polycarboxylic acids include $C_3$–$C_{21}$ linear saturated aliphatic dicarboxylic acids; the preferred acids are $C_4$–$C_{10}$ acids such as succinic, adipic, and sebacic. Cycloalkyl, cycloalkenyl, and aromatic, di-, tri-, and tetracarboxylic acids are also suitable, the preferred being hexahydrophthalic, tetrahydrophthalic, phthalic, isophthalic, and trimellitic acids. Mixtures of polycarboxylic acids may be used.

The resulting piperazine salts are essentially non-hygroscopic solids corresponding to the formula:

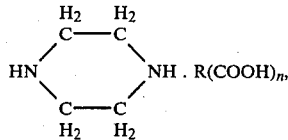

wherein R is an organic residue of a $C_3$–$C_{21}$ polycarboxylic acid and n is at least 2. The salts are very stable under 50° C. both by themselves and in epoxy resin systems.

The stoichiometric amount of piperazine salt, the preferred amount, to be added to the epoxy resin system may be calculated as follows:

$$\frac{\text{M. Wt. of Salt}}{\text{No. of COOH Groups in Salt} + 2} \times \frac{100}{\text{Eq. Wt. Polyepoxide}} \times$$

$$\frac{\text{Gms. of Salt}}{100 \text{ Gms. of Polyepoxide}}$$

wherein M. Wt. and Eq. Wt. refer to the molecular weight and equivalent weight, respectively. It is possible to use amounts less than or greater than the stoichiometric amount, with the amount being used depending on the properties desired in the cured resin as well as on the curing conditions. Mixtures of piperazine salts may be used to achieve certain properties in the cured resin.

The epoxide equivalent weight may be determined by reacting a sample of the polyepoxide with an excess of hydrochloric acid in dimethyl formamide and back-titrating the excess of hydrochloric acid with sodium hydroxide in methanol. Assuming a linear structure, the molecular weight is obtained by doubling the epoxide equivalent weight, i.e. grams of resin containing one equivalent of epoxide.

Preparation of Resin Systems

The polyepoxides which are required in the systems herein may be substituted or unsubstituted aliphatic, cycloaliphatic, aromatic and/or heterocyclic polyepoxides, such as glycidyl esters, glycidyl ethers, glycidyl amines, or epoxidized olefins. They may be substituted with non-interfering substituents such as halogen, hydroxyl and other groups.

U.S. Pat. Nos. 2,633,458; 3,547,885; 3,562,213; 3,746,686; and 4,066,625 describe suitable polyepoxides. Especially useful are liquid and solid aromatic polyepoxides, such as glycidyl polyethers having epoxide equivalent weights of 175–4000, preferably 175–1200. The preferred polyepoxides are the aromatic glycidyl polyethers formed by reacting an epihalohydrin with polyhydric phenols such as 4,4'-isopropylidenebis(2,6-dibromophenol), 1,1,3-tris(p-hydroxyphenyl)propane, 1,1-bis(4-hydroxyphenyl)ethane, 1,1,2,2-tetra(p-hydroxyphenyl)ethane, bis-(4-hydroxyphenyl)methane, 4,4'-dihydroxydiphenyl sulphone, hydroquinone, resorcinol, dihydroxydiphenyl, dihydroxy naphthalene, phenol-formaldehyde novolac, p-aminophenol, and o-cresol-formaldehyde novolac.

Especially useful are the glycidyl polyethers prepared from epichlorohydrin and 4,4'-isopropylidenediphenol (bisphenol A) which have the formula:

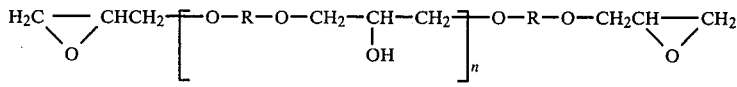

wherein R is the divalent hydrocarbon residue

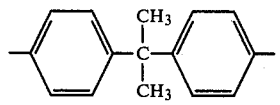

and n is a number up to 20. The molecular weight, softening point and viscosity generally depend on the ratio of epichlorohydrin to 4,4'-isopropylidenediphenol used in the preparation of the glycidyl polyether. The polyethers may be liquids (viscosity dependent on n) having epoxide equivalent weights from 175 to 280 or solids having softening points between 50° and 170° C. and epoxide equivalent weights from 385 to above 4,000. Preferred glycidyl polyethers are those having epoxide equivalent weights of 175–600.

Various modifying materials may be included in the epoxy resin systems, such as fillers, reinforcements, colorants, viscosity modifiers, flexibilizers, and/or plasticizer. A description of such modifiers may be found in "Epoxide Resins," W. G. Potter (New York: Springer-Verlag New York Inc., 1970) pp. 109–130.

In forming the unitary, heat-curable epoxy resin systems of this invention the polyepoxide and curing agent may be mixed at room temperature. In the case of liquid resin systems, the use of a diluent is optional. Suitable diluents are discussed in "Epoxide Resins," pp. 109–115 (cited previously). In the case of solid resin systems, the curing agent is preferably dry blended with the polyepoxide or gently heated with the polyepoxide at a temperature well below the curing temperature of that particular system.

The temperatures employed in the cure may vary from 50° to 250° C. A suitable curing time and temperature may be determined by a brief study of the effect of curing time and temperature on the tensile strength of the bond formed. The cure temperature selected is one that gives efficient and rapid curing coupled with good bond strength. Typically epoxy resin systems containing these piperazine salts begin to cure (gel) at between 120° and 160° C. after a period of time ranging from about 10 minutes to slightly under 2 minutes, depending upon the temperature. The cure time is defined as the time required to reach full bond strength at a given cure temperature; the gel time is defined as the length of time required for a liquid resin system to gel (i.e. develop significant viscosity changes due to crosslinking or polymerization).

The epoxy resin systems of this invention are particularly useful as adhesives and adhere to a wide variety of different materials such as wood, metal, glass, concrete, and plastics. Surfaces of the materials to be bonded are first cleaned in the known manner (see "Epoxide Resins" pp. 218–219, cited previously). When the epoxy resin system is a solid, it may be applied as a powder or melted in a separate container, at a temperature below the curing temperature, and applied in the usual manner.

The liquid epoxy resin systems of this invention may also be useful in castings, pottings, and encapsulations, as well as in forming laminates and for decorative and protective surface coatings. The solid epoxy resin systems may be used to form laminates using pressure and heat to impregnate the substrate or used to form coatings using fluidized bed or powder spray coating techniques.

The following examples will more fully illustrate the embodiments of this invention. In the examples, all parts are given by weight and all temperatures are in degrees Celsius unless otherwise noted.

EXAMPLE I

This example describes the procedure used to prepare several representative piperazine salts of this invention.

To a 500 ml round bottom flask equipped with a mechanical stirrer, thermometer, pressure-equalized addition funnel and condenser was charged a solution containing 0.2 mole of polycarboxylic acid in 200 ml of isopropyl alcohol. The internal temperature was increased to about 60° to 70° C., and a solution containing 0.2 mole of piperazine in 50 ml isopropyl alcohol was added over a 30 min period. As soon as the addition started, the piperazine salt precipitated. Stirring was continued for 30 min after completion of the addition; the mixture was allowed to cool to room temperature; the precipitate was recovered by filtration.

The polycarboxylic acids used and the melting point and yield of the resulting piperazine salts are given in Table I.

TABLE I

| Polycarboxylic Acid | Piperazine Salt Melting Point (°C.) | Yield (%) |
|---|---|---|
| Succinic | 190–193 | 86 |
| Adipic | 225–228 | 95 |
| Sebacic | 160–162 | 96 |
| Maleic | 162–165 | 95 |
| Hexahydrophthalic | 170–173 | 90 |
| Tetrahydrophthalic | 163–166 | 92 |
| Phthalic | 189–191 | 98 |
| Isophthalic | >240 | 99 |
| Trimellitic | >250 | 95 |

EXAMPLE II

This example gives the gel time and shelf life of epoxy resin systems containing the piperazine salts of Example I.

The systems were prepared by combining 100 parts by weight of Epon 828® (glycidyl polyethers marketed by Shell Chemical Co. and having an epoxide equivalent weight of 185–192) and a stoichiometric amount of the piperazine salt and then running the mixture through a three roll paint mill three times to achieve a finely ground dispersion.

The gel time at 120° and 160° C. and shelf life at room temperature are given in Table II.

TABLE II

| Curing Agent Piperazine-Polycarboxylic Acid Salt | Amount (parts/100 parts resin) | Gel Time 120° C. (min) | Gel Time 160° C. (sec) | Shelf Life (day) |
|---|---|---|---|---|
| Piperazine-Succinic | 27 | 23 | 156 | 60–65 |
| Piperazine Adipic | 30 | 35 | 180 | 50–55 |
| Piperazine-Sebacic | 38 | 9 | 100 | 50–55 |
| Piperazine-Maleic | 27 | 9.5 | 100 | 40–45 |
| Piperazine-Hexahydrophthalic | 34 | 10 | 170 | 60–70 |
| Piperazine-Tetrahydrophthalic | 34 | 5.5 | 108 | 35–40 |
| Piperazine-Phthalic | 33 | 10.5 | 120 | 50–55 |
| Piperazine-Isophthalic | 33 | 25 | 180 | 60–65 |
| Piperazine-Trimellitic | 31 | 30 | 480 | 140–150 |
| Piperazine (comparative) | 20 | 5 | 60–75 | 1/12 |

The results show that the piperazine salts significantly extended the room temperature shelf life of the epoxy resin systems and that the systems began to cure after a short time at moderately elevated temperatures.

EXAMPLE III

This example demonstrates the use, as adhesives, of unitary epoxy resin systems containing the piperazine salts of Example I.

Epoxy resin systems were formulated as in Example II and then cured. The tensile shear strength of steel to steel bonds was determined. The results are given in Table III.

TABLE III

| Curing Agent Piperazine-Polycarboxylic Acid Salt | Amount (parts/100 parts resin) | Cure Time 120° C. (hr) | Tensile Shear Strength (lb/in²) | (kg/cm²) |
|---|---|---|---|---|
| Piperazine-Succinic | 27 | 1 | 6800 | 479 |
| Piperazine-Adipic | 30 | 1 | 5600 | 400 |
| Piperazine Sebacic | 38 | 1 | 5400 | 380 |
| Piperazine-Maleic | 27 | 1 | 5700 | 401 |
| Piperazine-Hexahydrophthalic | 34 | 1 | 3300 | 232 |
| Piperazine-Tetrahydrophthalic | 34 | 1 | 6600 | 465 |
| Piperazine-Phthalic | 33 | 1 | 5700 | 401 |
| Piperazine-Isophthalic | 33 | 1 | 6800 | 479 |
| Piperazine-Trimellitic | 31 | 1 | 5400 | 380 |
| Dicyandiamide (comparative) | 8 | 3 | 6000–7000 | |

The tensile shear strength was determined using two stainless steel bars, having the dimensions 0.5 in (1.27 cm) by 4 in (10.16 cm) by 0.13 in (0.33 cm). The bars were degreased with methyl ethyl ketone, and a small amount of the liquid epoxy resin system was applied to the surface of one bar near the edge. The second bar was then pressed against the first to form an adhesive film such that there was a 0.25 in (0.64 cm) overlap for each bar and hence a bonding area of 0.125 in² (0.32 cm²). The bars were clamped together by means of a spring clip and allowed to cure at a moderately elevated temperatures for the time required to reach full cure (i.e. maximum bond strength). The bond strength, measured as tensile shear strength, was determined by pulling the bars apart with an Instron Tensile Tester at a crosshead operation speed of 0.1 in/min (0.25 cm/min). Values given were the average of five determinations.

The results show that the systems cured more rapidly than the comparative system containing dicyandiamide and that comparably strong bonds were formed.

EXAMPLE IV

This example shows the use of a piperazine salt as a curing agent in a solid epoxy resin system.

An epoxy resin system containing 10 parts of the piperazine-maleic acid salt of Example I and 100 parts of Epon 1001® (a glycidyl polyether marketed by Shell Chemical Co. and having an epoxide equivalent value of about 500 and a melting point of about 55°–60° C.) was prepared by grinding the mixture into a uniform fine powder. The system had a shelf life of over 1 year at room temperature. It cured in 10 minutes at 120° C. to give a thermoset material.

EXAMPLE V

This example demonstrates that the piperazine salts are essentially non-hygroscopic materials.

The piperazine salts were exposed to air at 70% relative humidity and 25° C. for 2 days. Their moisture absorption was less than 5%. The inertness of the piperazine salts in moist air makes them easier to store and to handle during the formulation of epoxy resin systems.

Summarizing, this invention is seen to provide unitary, storeable epoxy resin systems containing piperazine salts as the curing agent. The systems may be heat cured to give high performance products.

Now that the preferred embodiments of the present invention have been described in detail, various modifications and improvements thereon will become readily apparent to those skilled in the art. Accordingly, the spirit and scope of the invention are to be limited only by the appended claims and not by the foregoing specification.

I claim:

1. A unitary, storable, heat-curable epoxy resin system, which comprises a polyepoxide and a substantially stoichiometric amount of a salt of piperazine and a $C_3$–$C_{21}$ polycarboxylic acid, said salt having at least one carboxyl group per secondary amine group.

2. The system of claim 1, wherein said polyepoxide is a glycidyl polyether of 4,4'-isopropylidenediphenol having an epoxide equivalent weight of from 175 to 4000.

3. The system of claim 1, wherein said salt is used in a stoichiometric amount.

4. The system of claim 1, wherein said polycarboxylic acid is a $C_4$–$C_{10}$ linear saturated aliphatic dicarboxylic acid.

5. The system of claim 4, wherein said polycarboxylic acid is succinic, adipic, or sebacic acid.

6. The system of claim 1, wherein said polycarboxylic acid is a cycloalkyl, cycloalkenyl or aromatic polycarboxylic acid.

7. The system of claim 6, wherein said cycloalkyl polycarboxylic acid is hexahydrophthalic acid, said cycloalkenyl polycarboxylic acid is tetrahydrophthalic acid, and said aromatic polycarboxylic acid is phthalic, isophthalic, or trimellitic acid.

8. A process for converting a polyepoxide into an insoluble, infusible resin product, which comprises heating said polyepoxide at an elevated temperature with a substantially stoichiometric amount of a salt of piperazine and a $C_3$–$C_{21}$ polycarboxylic acid, said salt having at least one carboxyl group per secondary amine group, said heating taking place at a temperature above 50° C. for a time sufficient to complete the cure.

9. The process of claim 8, wherein said polyepoxide is a glycidyl polyether of 4,4'-isopropylidenediphenol having an epoxide equivalent weight of from 175 to 4000.

10. The process of claim 8, wherein said salt is added in a stoichiometric amount.

11. The process of claim 8, wherein said polycarboxylic acid is selected from the group consisting of succinic, adipic, sebacic, hexahydrophthalic, tetrahydrophthalic, phthalic, isophthalic, and trimellitic acids.

* * * * *

UNITED STATES PATENT AND TRADEMARK OFFICE
CERTIFICATE OF CORRECTION

PATENT NO. : 4,312,974
DATED : January 26, 1982
INVENTOR(S) : Wen B. Chiao

It is certified that error appears in the above—identified patent and that said Letters Patent is hereby corrected as shown below:

At column 3, lines 24-26 that portion of the formula reading $$X \frac{100}{Eq. Wt. Polyepoxide} X \quad \text{should read} \quad X \frac{100}{Eq. Wt. Polyepoxide} =$$

Signed and Sealed this

Twentieth Day of April 1982

|SEAL|

*Attest:*

*Attesting Officer*

GERALD J. MOSSINGHOFF

*Commissioner of Patents and Trademarks*